(12) United States Patent
Spies et al.

(10) Patent No.: US 11,221,076 B2
(45) Date of Patent: Jan. 11, 2022

(54) DEVICE FOR REGULATING A FLOW-THROUGH AND DISTRIBUTING A FLUID IN A FLUID CIRCUIT

(71) Applicant: Hanon Systems, Daejeon (KR)

(72) Inventors: Toni Spies, Cologne (DE); Tobias Haas, Cologne (DE); Dominik Wiechard, Cologne (DE); Markus Herzog, Bedburg (DE)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/453,527

(22) Filed: Jun. 26, 2019

(65) Prior Publication Data

US 2020/0003311 A1 Jan. 2, 2020

(30) Foreign Application Priority Data

Jun. 27, 2018 (DE) .......................... 102018115454.2
Apr. 29, 2019 (DE) .......................... 102019111018.1

(51) Int. Cl.
| | | |
|---|---|---|
| *F16K 5/06* | (2006.01) | |
| *F16K 11/087* | (2006.01) | |
| *F25B 30/00* | (2006.01) | |
| *F25B 5/02* | (2006.01) | |
| *B60H 1/03* | (2006.01) | |

(52) U.S. Cl.
CPC ........ *F16K 5/0605* (2013.01); *F16K 11/0873* (2013.01); *F16K 11/0876* (2013.01); *F25B 5/02* (2013.01); *F25B 30/00* (2013.01); *B60H 1/039* (2019.05)

(58) Field of Classification Search
CPC ............... F16K 5/0605; F16K 11/0873; F16K 11/0876; Y10T 137/8782
See application file for complete search history.

(56) References Cited

U.S. PATENT DOCUMENTS

| 5,356,112 A * | 10/1994 | Simar .................... F16K 31/043 251/129.11 |
| 5,445,187 A * | 8/1995 | Farquhar ............. F16K 11/0873 137/625.32 |
| 7,506,664 B2 * | 3/2009 | Norris ................ B60H 1/00485 137/625.17 |

FOREIGN PATENT DOCUMENTS

| CN | 104315201 A | 1/2015 |
| DE | 10 2013 206 626 A1 | 10/2014 |
| DE | 20 2013 005960 U1 | 10/2014 |
| DE | 10 2014 105 097 A1 | 10/2015 |
| ES | 163446 U | 1/1971 |
| KR | 200383943 Y1 | 5/2005 |
| KR | 20140103586 A | 8/2014 |

\* cited by examiner

*Primary Examiner* — Seth W. Mackay-Smith
(74) *Attorney, Agent, or Firm* — Norton Rose Fulbright US LLP; James R. Crawford

(57) ABSTRACT

Device for regulating and controlling a flow-through and distributing a fluid in a fluid circuit has a housing with ports connecting fluid lines that are connected across a passage aperture with an interior volume of the housing, a valve element disposed in the interior volume of the housing, a drive element for moving the valve element relative to the housing.

25 Claims, 6 Drawing Sheets

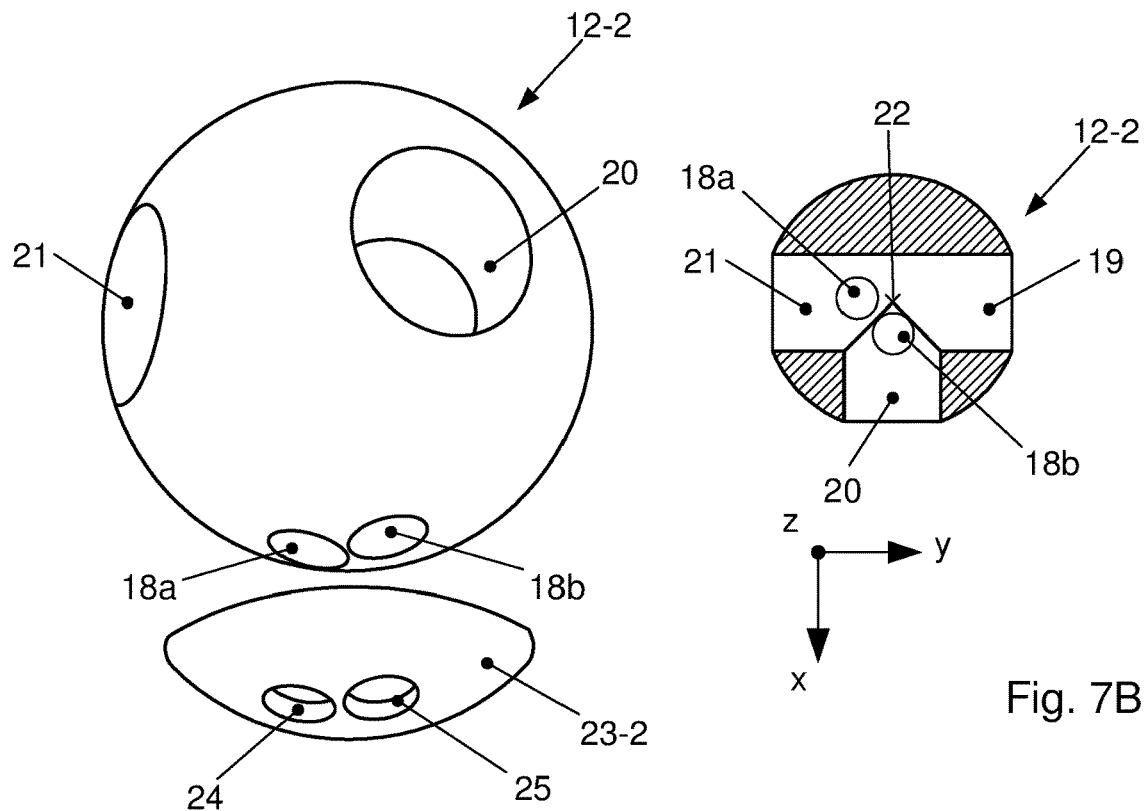
Fig. 7A
Fig. 7B
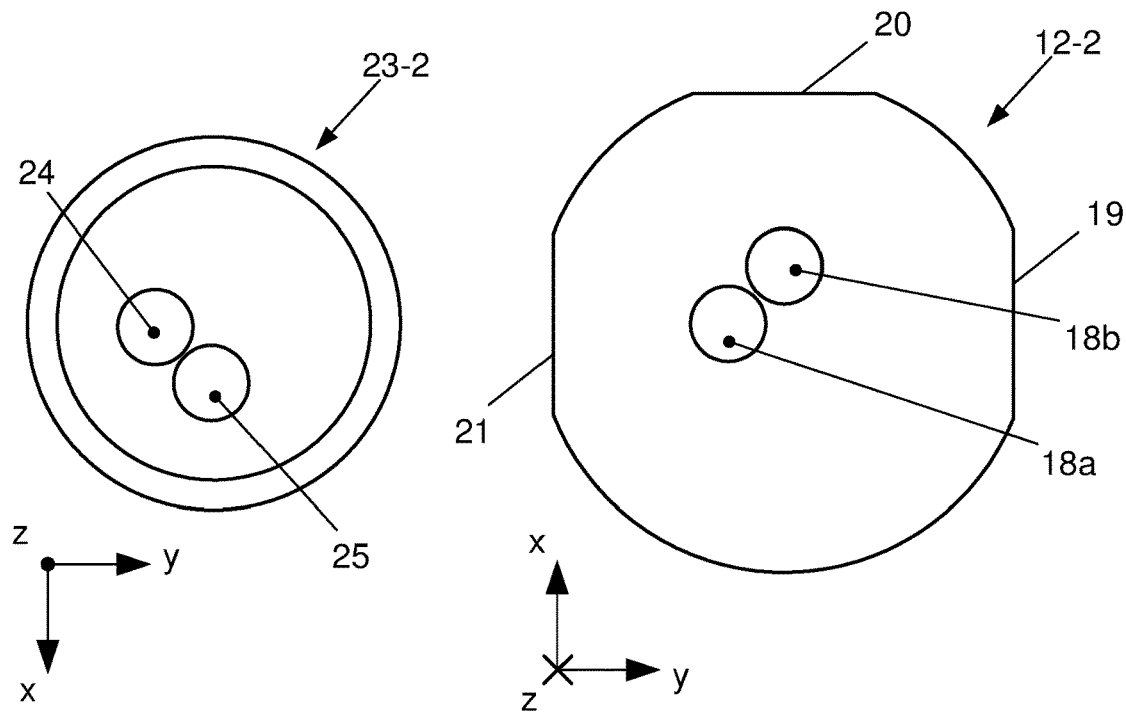
Fig. 8A
Fig. 8B

DEVICE FOR REGULATING A FLOW-THROUGH AND DISTRIBUTING A FLUID IN A FLUID CIRCUIT

This application claims priority from German Patent Application Nos. 102018115454.2 filed on Jun. 27, 2018 and 102019111018.1 filed on Apr. 29, 2019. The entire contents of these applications are incorporated herein by reference in their entirety.

FIELD OF THE INVENTION

The invention relates to a device for regulating or controlling a flow-through and distributing a fluid in a fluid circuit, in particular a refrigerant in a refrigerant circuit. The device comprises a housing with ports for the connection with fluid lines, each of which being connected across passages within an interior volume of the housing, as well as a valve element, disposed in the interior volume of the housing, with a drive element for moving the valve element relative to the housing.

SUMMARY OF THE INVENTION

In motor vehicles of prior art high demands made of the climate control systems in motor vehicles for the comfort of the passengers in the passenger compartment are met by different circuits for refrigerant and coolant with differently operated heat exchangers.

Conventional and future motor vehicles with electromotive drive, termed electric vehicles or abbreviated EVs, or FCV for "fuel cell vehicles", or motor vehicles with hybrid drive of electric motor and internal combustion engine, abbreviated hybrid vehicles or HEV for hybrid electric vehicles, due to the implementation with additional components of the electric powertrain, such as a high-voltage battery, an internal charger, a transformer, an inverter as well as the electric motor, most frequently have greater supply requirements of cold or heat than motor vehicles driven purely by internal combustion engines. Apart from the refrigerant circuit of the climate control system proper, known motor vehicles with purely electric drive or electric hybrid drive are equipped with a coolant circuit. The coolant for the dissipation of the heat emitted by the drive components circulates through a coolant-refrigerant heat exchanger in this coolant circuit in order to transfer the heat from the coolant to the refrigerant circulating in the refrigerant circuit. As an increased demand for cooling the energy stores, the listed vehicles are in particular implemented with a feasibility for boost charging the electrical energy stores, such as the high-voltage battery of the powertrain.

Due to the required energy demands, thermal systems of electrically driven motor vehicles have a considerable impact on the range of motor vehicles. Through the requisite distribution of heat flows in the motor vehicle, using different subsystems, faster conditioning for example is enabled of components that require optimal operating temperatures. In battery-electrically operated motor vehicles, or BEVs, and motor vehicles with hybrid drive, in which, in addition to conditioning the passenger compartment, also the conditioning of high-voltage components of the power train is of particular interest, the impact of operating the thermal systems on the range of the motor vehicle must be minimized.

Prior art furthermore discloses implementing refrigerant circuits of climate control system such that they are operable in heat pump mode as well as also in chiller mode in order to distribute thermal energies within the motor vehicle. Especially when operating the refrigerant circuit for example in heat pump mode, heat can be absorbed from ambient air or from a coolant circuit, that is subsequently transferred to components of the motor vehicle requiring heat. During operation of the refrigerant circuit in chiller mode, heat can be absorbed from the passenger compartment or from the air flowing into the passenger compartment or other components and be transferred, for example, to the surroundings. Within the thermal systems, the heat carrier circuits, such as refrigerant circuits and coolant circuits are herein interconnected and connected with further components of the motor vehicle. Specifically, in the case of hybrid-driven motor vehicles, there are encountered great challenges regarding the disposition and placement of the thermal system for conditioning different components within the available installation space.

Specifically, the refrigerant circuits of the climate control systems, or of the thermal systems, of motor vehicles are growing increasingly more complex and include providing energy efficient solutions for conditioning the inflowing air of the passenger compartment, such as cooling, dehumidifying or heating. With an increasing number of functions of the systems, the number of components, in particular the number of valves, is growing larger.

DE 10 2013 206 626 A1 discloses a refrigerant circuit for the climate control of a motor vehicle. The refrigerant circuit comprises a compressor as well as several heat exchangers operated as evaporators or condensers for the transfer of heat with the refrigerant. The components of the refrigerant circuit, in particular the large number of valves, are each integrated in the refrigerant circuit across connection lines.

The required large number of valves and connection lines demands considerable installation space and, in addition to high costs, also causes a significant weight of the refrigerant circuit.

DE 10 2014 105 097 A1 discloses a valve block arrangement for several valves, in particular expansion valves or check valves. The arrangement comprises a valve block with several flow paths for fluids as well as several adjuster units with associated drive units. The valve block is implemented in two parts of a flow path element with the flow paths and a delimitation element. The valve block arrangement herein comprises specifically four refrigerant valves combined in a block in order to reduce in this manner the number of connection lines in the refrigerant circuit.

The highly complex implementation of the two-part valve block arrangement requires additional components, such as sealings, guides and threaded joints, which again leads to high production costs, high susceptibility to errors during assembly, high demands made of leak impermeability and strength and rigidity as well as heavy weight.

DE 20 2013 005960 U1 discloses a 3/2 directional control valve that is implemented as a ball stop valve and comprises three connections, wherein two connections are implemented exclusively as inlets and one exclusively as outlet. The fluid circulating in the circuit can only be routed from one of the two inlets or from both inlets together in the direction toward the outlet by different valve positions. It is not possible to control the connections individually independently of one another. Between the inlets there is always one open connection. The inlets and the outlet cannot be reversed in terms of their particular function such that the fluid could flow out through an inlet or flow in through an outlet. To ensure such functions, additional external valves, in particular check valves, have to be provided.

OBJECTS OF THE INVENTION

The invention addresses the problem of providing a device for the regulation and control of a flow-through and the distribution of a fluid in a fluid circuit, in particular in refrigerant circuits, of a thermal system of a motor vehicle. With a minimal number of components, such as valves and connection lines, a maximal number of heat sources and heat sinks of the thermal system, specifically of a battery-electrically or a hybrid-driven motor vehicle, are herein to be interconnected at the refrigerant side while maintaining the entire functionality. In addition, the production, maintenance and operating costs as well as the requisite installation space of the device are to be minimal. The thermal system is to be operable at maximum efficiency without any restrictions.

SUMMARY OF THE INVENTION

The problem is resolved through the subject matters of the invention described herein.

The problem is resolved through a device for regulating and controlling a flow-through and distributing a fluid in a fluid circuit, in particular a refrigerant in a refrigerant circuit. The device comprises a housing with ports for connecting with fluid lines which are each connected across a passage, developed in particular in the form of a circular cylinder, with an internal volume of the housing, as well as a valve element, disposed in the interior volume of the housing, with a drive element for moving the valve element relative to the housing.

According to the concept of the invention, the valve element is supported rotatably about a rotational axis and comprises as through-holes in particular openings, preferably at least four openings, developed in particular in the form of circular cylinders. The through-holes form a common volume in the interior of the valve element. An axis of symmetry of an at least one through-hole of a first opening and the axis of rotation of the valve element as well as an axis of symmetry of a passage of a first connection port of the housing are disposed in a direction z, while axes of symmetry of through-holes of at least three openings of the valve element and of through-holes of two ports of the housing are disposed in a plane spanned by two directions x and y. The directions x, y, z are oriented perpendicularly to one another.

According to a further development of the invention, the axes of symmetry of the passages of the first port, of a second port as well as of a third port of the housing and the axis of rotation of the valve element have a common point of intersection in which the center of the valve element is disposed.

The first port of the housing is preferably disposed on a side of the drive element opposite to the valve element, while the second port and the third port are implemented on sides opposite to one another and differing from the side of the first port of the preferably cuboidal housing.

The axes of symmetry of the passages of the second port and of a third port of the housing are advantageously disposed on a common axis oriented in the y-direction. The axes of symmetry of the passages of the first port, of the second port as well as of the third port of the housing are implemented in the form of a T in a plane spanned by the directions y and z.

According to a further advantage of the invention, the axis of symmetry of the passage of the first port of the housing and the axis of rotation of the valve element are oriented coaxially.

According to a preferred embodiment of the invention, the valve element is implemented in the form of a sphere or a circular cylinder.

The axes of symmetry of the at least three openings of the valve element, disposed in a plane spanned by the directions x and y, advantageously have a common point of intersection in the center of the valve element. The axis of rotation of the valve element preferably extends through the center of the valve element.

A further advantage of the invention comprises that the axis of symmetry of the at least one through-hole of the first opening is oriented spaced apart from the axis of rotation of the valve element, and thus oriented eccentrically to the valve element, such that the axes of symmetry of the at least one through-hole of the first opening of the valve element and of the passage of the first port of the housing are disposed in parallel and offset with respect to one another.

According to a further development of the invention, the axes of symmetry of three of the openings, disposed in the plane spanned by two directions x and y, of the valve element are oriented to one another in the form of a T. The axes of symmetry of a second opening and of a third opening as well as of the third opening and a fourth opening are each disposed orthogonally to one another, the axes of symmetry of the second opening and of the fourth opening are coaxial. The second opening, the third opening and the fourth opening of the valve element are in particular provided in a plane with the second port and the third port of the housing.

According to a further preferred embodiment of the invention, the axes of symmetry of a first through-hole of the first opening and of the second opening of the valve element are oriented intersectingly. The axis of symmetry of the first through-hole of the first opening is disposed offset from the center of the valve element in the direction of the fourth opening. The axis of symmetry of the first through-hole of the first opening, in addition, intersects a lead-through developed between the second opening and the fourth opening in a great circle sectional plane, preferably at an included angle of 90°.

According to a further advantageous embodiment of the invention, the first opening of the valve element is developed with a first through-hole and second through-hole of at least two through-holes. The axes of symmetry of the at least two through-holes of the first opening are disposed on a common reference circle diameter referred to the axis of rotation of the valve element.

The axes of symmetry of the at least two through-holes of the first opening are preferably offset at an angle of 90° about the axis of rotation of the valve element as well as being oriented parallel to each other and thus parallel to the axis of rotation of the valve element.

The axes of symmetry of the second through-hole of the first opening and of the third opening of the valve element are preferably oriented so as to intersect. The axis of symmetry of the second through-hole of the first opening is offset from the center of the valve element in the direction of the third opening. The axis of symmetry of the second through-hole of the first opening intersects the through-hole of the third opening in a great circle sectional plane, preferably at an included angle of 90°.

The at least one through-hole of the first opening of the valve element is preferably developed on a side that is opposite to the side oriented to the drive element. In the case in which the valve element is implemented in the form of a sphere, the at least one through-hole of the first opening of the valve element and the drive element are disposed substantially diametrically to one another, while in the case of a circular cylindrical implementation of the valve element the at least one through-hole of the first opening of the valve element and the drive element are disposed in the region of the oppositely located end sides of the circular cylinder.

The through-holes of the at least three openings, disposed in the plane spanned by the directions x, y of the valve element have preferably identical diameters that are constant over their length and consequently have constant flow cross section that are of equal magnitude.

The at least one through-hole of the first opening of the valve element, furthermore, is developed with a diameter that is constant over its length. The diameter of the at least one through-hole of the first opening is herein equal to or less than the diameter of the openings of the valve element disposed in the plane spanned by the directions x, y.

According to a further embodiment of the invention, the through-holes of the ports of the housing have substantially identical diameters that are constant over their length, wherein the diameters of the through-holes of the ports of the housing are in each instance greater than the diameter of the at least one through-hole of the first opening of the valve element as well as greater or equal to the diameters of the through-holes of the openings of the valve element disposed in the plane spanned by the directions x, y.

According to a further preferred embodiment of the invention, a flow cross section of the passage of the first port of the housing in the proximity of the contact of the valve element on the housing is covered, such that only at least two outlet openings are developed in the direction of the valve element with the at least one through-hole of the first opening. The entire flow cross section of the outlet openings is herein less than the flow cross section of the passage of the first port of the housing.

The outlet openings have each advantageously a circular flow cross section, in particular of equal diameter, and are disposed with their centers on a common reference circle diameter in the case the valve element is implemented in the form of a sphere referred to a projected center of a spherical shell or, in a circular cylindrical implementation of the valve element, referred to a center of a circular end face of a cylinder.

The diameters of the outlet openings are preferably in each instance greater than or equal to the diameter of a through-hole of the first opening of the valve element. Furthermore, a reference circle diameter on which the centers of the outlet openings are disposed, corresponds preferably to a reference circle diameter on which at least one through-hole of the first opening of the valve element are disposed. The reference circle diameter is herein in each instance referred to the projected center of the sphere.

According to a further development of the invention, a first outlet opening and a second outlet opening disposed adjacently to the first outlet opening, in the case of a spherical implementation of the valve element, is disposed at an angle of 90°, referred to the projected center of the spherical shell or, in the case of implementation in the form of a circular cylinder of the valve element, referred to the center of the end side of the cylinder.

In the proximity of the contact of the valve element on the housing at least three outlet openings can be developed, wherein the first outlet opening and a third outlet opening, disposed adjacently to the first outlet opening are also disposed at an angle of 90°, in the case of a spherical implementation of the valve element, referred to the projected center of the spherical shell or, with the circular cylindrical implementation of the valve element, referred to the center of the end face of the cylinder. The second outlet opening and the third outlet openings are herein oriented at an angle of 0° or of 180° to one another.

A further advantage of the invention comprises that axes of symmetry of the outlet openings, in the case of spherical implementation of the valve element, have in each instance the identical inclination referred to the projected center of the spherical shell such that the axes of symmetry of the outlet openings intersect in a common point on an axis of symmetry of the spherical shell or are disposed parallel to one another and to the axis of symmetry of the spherical shell or an axis of symmetry of the circular cylinder.

According to an advantageous embodiment of the invention, for the coverage of the flow cross section of the passage of the first port of the housing, in the proximity of the contact of the valve element on the housing, a cover element with at least two outlet openings is developed. The cover element is preferably disposed in the housing fixedly and stationarily relative to the housing.

The cover element can herein be connected with the housing under form closure or under material closure. Furthermore, depending on the implementation of the device, between the cover element and the housing a sealing element, in particular in the form of an O-ring, can be disposed such that the cover element is supported in the housing.

In the case the valve element is implemented in the form of a sphere, in particular as a uniform segment of a spherical shell or in the case of a circular cylindrical implementation of the valve element, in particular as a circular disk, the cover element is in each instance preferably developed with constant wall thickness and is disposed within the housing in the direction z between the valve element and the housing. A contour of an inner surface of the spherical shell of the cover element herein preferably corresponds to a contour of an outer surface of the spherical valve element. The housing preferably comprises, moreover, a recess for the integrating reception of the cover element. For the complete adaption of the cover element, the recess is developed such that it corresponds to the contour of an outer surface of the spherical shell.

The axis of rotation of the cover element and the axis of symmetry of the passage of the first port of the housing are in particular disposed on a common axis.

According to a further development, the valve element is connected across a connecting element with a drive element disposed outside of the housing. The axis of symmetry of the passage of the first port of the housing and the connecting element are preferably disposed on a common axis.

The connecting element is advantageously developed as a shaft. The connecting element is disposed in particular on a first end fixedly with the drive element and on a second end, developed distally to the first end, projects through a side into the housing and is disposed connected to the valve element.

The drive element is preferably developed as an electric servomotor, in particular as a stepping motor.

The device according to the invention is developed as a highly integrated component, in particular as a refrigerant valve, specifically as a multipath ball valve for application in refrigerant circuits, for carrying out several, in particular blocking functions. In the device a multiplicity of functions of individual valves is combined. The device enables in particular allowing or avoiding flow-through at all three ports of the housing independently of one another, which means also to close completely all three ports simultaneously.

The advantageous embodiment of the invention enables the use of the device for regulating and controlling a flow-through and for distributing a fluid in a refrigerant circuit of a thermal system, in particular of a thermal management system, of a motor vehicle for conditioning at least one air mass flow to be supplied to a passenger compartment as well as to at least one component of a powertrain. The thermal system can herein comprise at least the one refrigerant circuit as well as at least one coolant circuit also for the absorption of heat from the refrigerant circuit. The device in that case serves as an adaptive multipath refrigerant valve for the motor vehicle climate control.

In summary, the device according to the invention, in particular as a highly variable refrigerant valve with a multiplicity of possible flow paths for the refrigerant, comprises diverse advantages:
- with a minimal number of components a maximal number of heat sources and heat sinks of the thermal system, specifically of a battery-electric or hybrid driven motor vehicle, can be interconnected at the refrigerant side,
- reduced complexity during the assembly leads to a lower number of error and reject probabilities, which reduces the warranty costs to be expected,
- minimization of weight,
- minimization of leakage of refrigerant due to the omission of connection lines and sealing sites, thereby reduction of costs to the end consumer in the event of service,
- protection of the environment and smaller dimensioning of collector and/or accumulator volume since lesser initial refrigerant filling quantity is required, thereby minimal costs to the vehicle manufacturer,
- maximal efficiency in the operation of the thermal system, and
- minimal production, maintenance and operating costs as well as minimal required installation space.

Further details, characteristics and advantages of embodiments of the invention will become evident based on the following description of embodiment examples with reference to the associated drawing.

BRIEF DESCRIPTION OF THE FIGURES

FIG. 7B: the second implementation of the valve element from FIG. 7A in a sectional representation, FIG. 8A: the cover element from FIG. 7A in a top view, FIG. 8B: the valve element from FIG. 7A in a side view.

DETAILED DESCRIPTION

Figure 1:
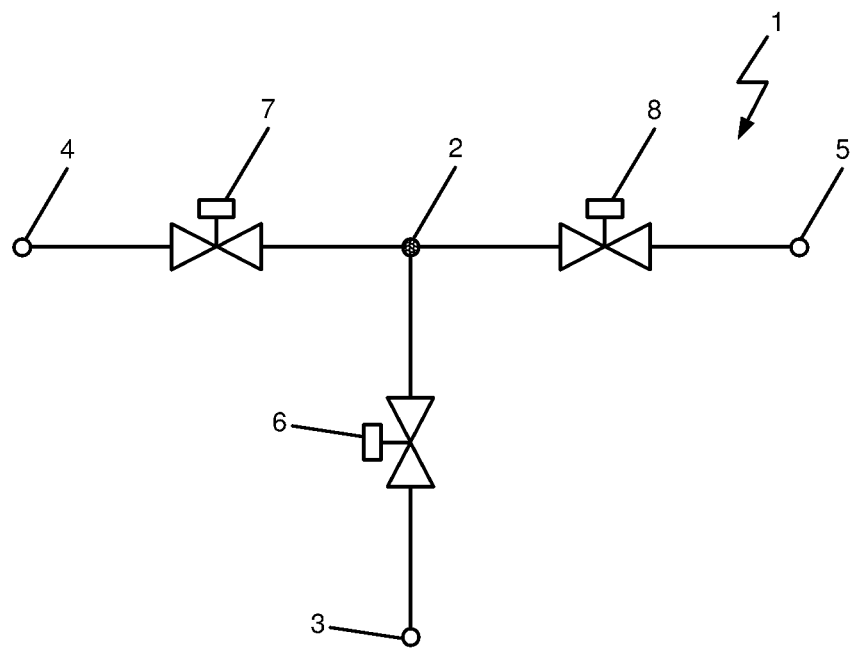
FIG. 1: a connection configuration of three valves as a section from a fluid circuit, in particular from a refrigerant circuit, of a climate control system of a motor vehicle.

In FIG. 1 is shown a connection configuration 1 of three valves 6, 7, 8 as a section from a fluid circuit, in particular from a refrigerant circuit of a climate control system of a motor vehicle. The refrigerant circuit can be developed with at least one compressor and in each instance several heat exchangers operable as evaporators or condensers/gas coolers for the transfer of heat with the refrigerant. To each condenser/gas cooler is herein assigned a valve, in particular a check valve, for example a solenoid valve. The components of the refrigerant circuit are fluidically connected with one another across connection lines.

When the refrigerant in subcritical operation of the refrigerant circuit, such as for example with the refrigerant R134a or under certain ambient conditions with carbon dioxide, is liquified, the heat exchanger is termed condenser. A portion of the heat transfer takes place at constant temperature. In supercritical operation, or at supercritical heat release in the heat exchanger, the temperature of the refrigerant decreases continuously. In this case the heat exchanger is also termed gas cooler. Supercritical operation can occur under certain ambient conditions or operating modes of the refrigerant circuit, for example with the refrigerant carbon dioxide.

The connection configuration 1 comprises a connection site 2 as well as three ports 3, 4, 5. At the connection site 2 three connection lines from different flow paths of the not depicted refrigerant circuit are connected with one another. Each port 3, 4, 5 is coupled with the connection site 2. Provided between the connection site 2 and a first port 3 is a first valve 6, between the connection site 2 and a second port 4 is a second valve 7, and between the connection site 2 and a third port 5 is provided a third valve 8. The valves 6, 7, 8 are preferably developed as check valves.

The connection configuration 1 can be connected to every port 3, 4, 5 with a heat exchanger, operated for example as evaporator or condenser/gas cooler, a compressor, a fluid store, in particular refrigerant collector or accumulator, or similar. To route the refrigerant flow within the refrigerant circuit, every flow path of the connection configuration 1 can at least be opened or closed.

Such check functions are conventionally realized using three separately developed check valves. To each flow path therein is assigned a valve to be independently operated. Each valve is developed for carrying out only one function such that a multiplicity of valves and connection lines is required. The functions of the individual valves are now linked in one device.

The refrigerant circuit in which such device is applied can be operated with any desired refrigerant, in particular R1234yf, R134a, R744, R404a, R600a, R290, R152a, R32 as well as with mixtures thereof.

Figure 2:
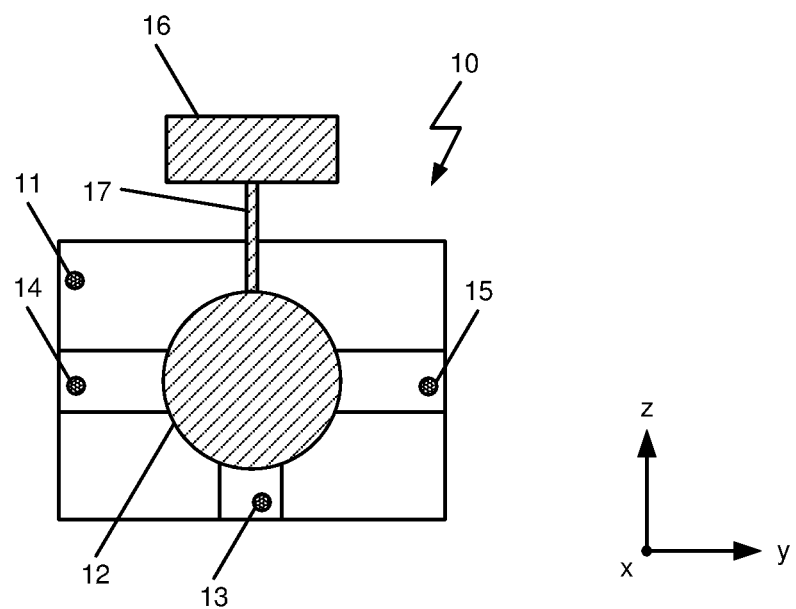
FIG. 2: a device for regulating and controlling a flow-through and distributing a fluid in a fluid circuit, in particular a valve for refrigerant circuits of a thermal system of a motor vehicle in schematic representation.

In FIG. 2 is depicted in schematic representation a device 10 for regulating and controlling a flow-through and distributing a fluid in a fluid circuit, in particular a valve for refrigerant circuits of thermal systems of a motor vehicle. The device 10 is developed as a highly integrated refrigerant valve for carrying out several functions, to replace, in particular, at least three valves, specifically check valves, of prior art and to reduce the number of components of the fluid circuit.

The device 10 comprises a preferably cuboidal housing 11 with a first port 13, a second port 14 as well as a third port 15 which, depending on function and operating mode, serve as inlet or outlet of the refrigerant. The ports 13, 14, 15 for refrigerant lines as connection lines with other components of the refrigerant circuit are each connected within an interior volume of housing 11 across passages. Within the volume a valve element 12 is disposed. Axes of symmetry of the passages of ports 13, 14, 15 and an axis of rotation of the valve element 12 have a common point of intersection in which the valve element 12 is disposed.

Except for the regions of the ports 13, 14, 15, the housing 11 developed in the form of a valve block is closed. The outer form of the housing 11 is developed such that the functions, for example also the precise disposition within a system, are ensured and the cost-effective series production at minimal component weight is enabled.

The spherical valve element 12 is connected across a connecting element 17 disposed on the axis of rotation of the valve element 12, with a drive element 16 provided outside of housing 11. The connecting element 17 developed, for example, as a shaft or a control shaft is fixedly connected at a first end with the drive element 16. With the second end, developed distally to the first end, the connecting element 17 is disposed such that it projects into housing 11 through the wall of housing 11. The drive element 16, also termed drive element, is developed for example as a servomotor for driving the connecting element 17.

The first port 13 is disposed on the housing 11 on the opposite side of the drive element 16, while the second port 14 and the third port 15 are developed on sides opposite to one another and differing from the side of the first port 13. The passages of the second port 14 and of the third port 15 are disposed on a common axis oriented in the y-direction, such that between the two ports 14, 15 extends a straight-line lead-through. The passage of the first port 13 and the connecting element 17 are also disposed on a common axis extending in the z-direction. The passages of ports 13, 14, 15 are developed in the form of a T in a plane spanned by the directions y and z, wherein the axes of symmetry of the passages intersect in the center of the valve element 12. The direction x is in each instance oriented orthogonally to the directions y and z.

Figure 3A:
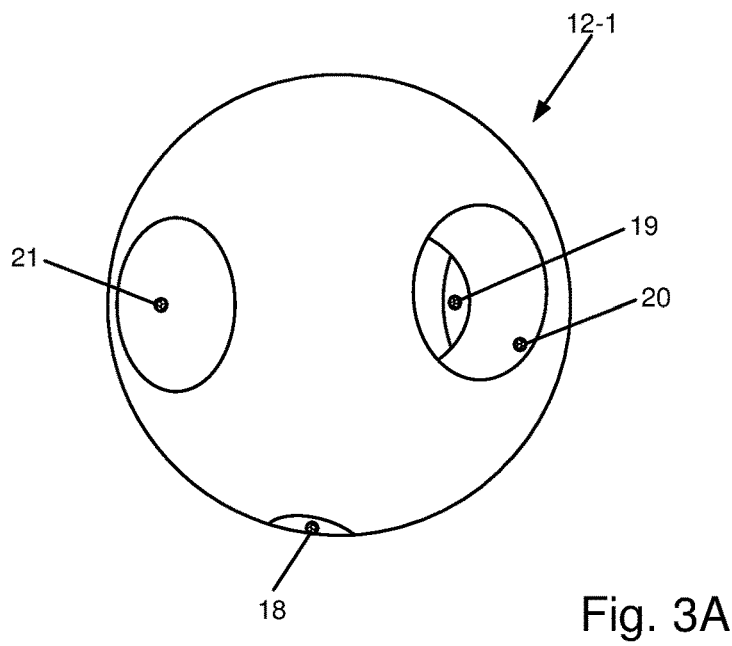
FIGS. 3A and 3B: a first implementation of a valve element of a device from FIG. 2 in a perspective view as well as in a sectional representation.
Figure 3B:
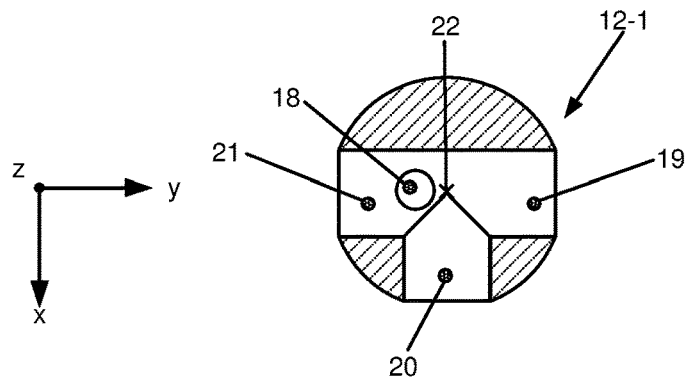

FIGS. 3A and 3B show a first implementation of a valve element 12-1 of a device 10 from FIG. 2 in a perspective view as well as a sectional representation through a great circle plane. The valve element 12-1 comprises four circular cylindrical openings 18, 19, 20, 21, developed as through-holes, whose flow cross sections are developed with diameters that are constant over the length of openings 18, 19, 20, 21. The diameter of a first opening 18 is herein less than the diameters of the three further openings 19, 20, 21, wherein their diameters preferably have equal values.

The axes of symmetry of a second opening 19, of a third opening 20 as well as of a fourth opening 21, which are disposed within a center plane spanned by the directions x and y, and thus are disposed orthogonally to the axis of rotation 22 of the valve element 12-1, have a common point of intersection in the center of the valve element 12-1. The second opening 19 and the fourth opening 21 are disposed at an angle of 0° or of 180° to one another such that between the two openings 19, 21 a straight-line lead-through extends. The third opening 20, also provided in the center plane, is oriented orthogonally to the lead-through developed between the second opening 19 and the fourth opening 21. Thus, the angle included between the second opening 19 and the third opening 20 as well as between the third opening 20 and the fourth opening 21 is in each instance 90°.

The axis of symmetry of the first opening 18 is oriented parallel to the axis of rotation 22 extending in the z-direction of valve element 12-1 and eccentrically to valve element 12-1. The axis of symmetry of the first opening 18 and the axis of rotation 22 of the valve 12-1 are spaced apart such that the axis of symmetry of the first opening 18 intersects the lead-through between the second opening 19 and the fourth opening 21 in a great circle sectional plane. The axis of symmetry of the first opening oriented orthogonally to the lead-through developed between the second opening 19 and the fourth opening 21 is, referred to the center point of the valve element 12-1, offset in the direction toward the fourth opening 21. The angles between the first opening 18 and the second opening 19 as well as of the fourth opening 21 are each 90°.

The first opening 18 of valve element 12-1 is developed on a side that is opposite to the side with the connection of valve element 12-1 with the not depicted connecting element 17 of the drive element 16.

Figure 4:
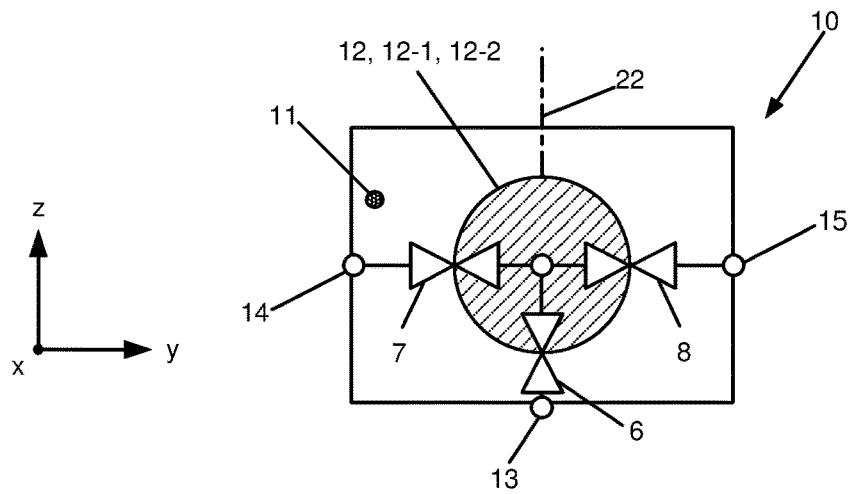
FIG. 4: the device from FIG. 2 with a valve element according to FIGS. 3A and 3B, FIG. 5A: the first implementation of the valve element from FIGS. 3A and 3B in combination with a first implementation of a cover element in a perspective view.

The spherical valve element 12, 12-1, 12-2 according to FIG. 4 which shows the device 10 from FIG. 2 by example with a valve element 12-1 according to FIGS. 3A and 3B, is oriented within the housing 11 such that the through-hole of the first opening 18 of valve element 12-1 and the passage of the first port 13 of housing 11 can form a common through-flow opening. The axes of symmetry of the first opening 18 of valve element 12-1 and the passage of the first port 13 of housing 11 are disposed in parallel and offset with respect to one another.

Valve element 12-1 with openings 18, 19, 20, 21 is disposed within housing 11 with ports 13, 14, 15 as well as the associated passages such that it is movable to block or clear through-flow openings for the refrigerant. The second opening 19, the third opening 20 and the fourth opening 21 of valve element 12, 12-1 are oriented in a plane with the second port 14 and the third port 15 of housing 11 such that the openings 19, 20. 21, depending on requirements and position of the valve element 12, 12-1 within the housing 11 can communicate with ports 14, 15.

The diameters of the passages of ports 13, 14, 15 of housing 11 have preferably the same values and are each greater than or equal to the diameters of the through-holes of the second to fourth openings 19, 20, 21 as well as greater than the diameter of the through-hole of the first opening 18 of valve element 12, 12-1.

The valve element 12-1 is, moreover, sealed fluidically tight against housing 11, in order to provide specifically inlets and outlets for the refrigerant. The fabrication tolerances of the individual components of device 10 are selected such that the fluid, in particular the refrigerant, can only flow through ports 13, 14, 15 with the passages as well as openings 18, 19, 20, 21 of valve elements 12, 12-1 and undesirable bypass flows between the surface of valve element 12, 12-1 and the housing 11 are avoided.

Figure 5A:
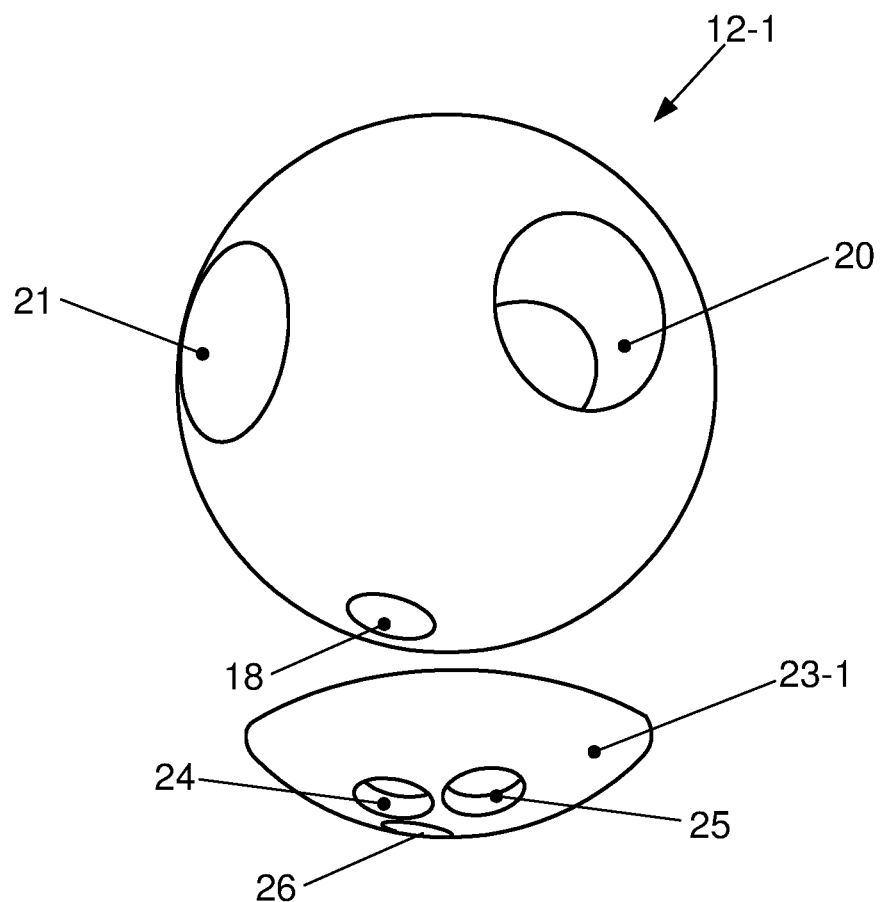
FIG. 5B: the cover element from FIG. 5A in top view.
Figure 5B:
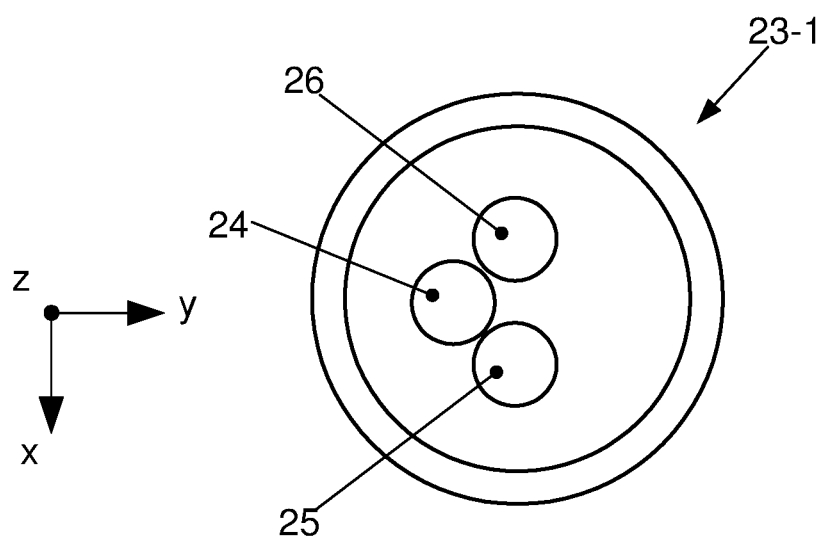

In FIG. 5A the first implementation of valve element 12-1 from FIGS. 3A and 3B is shown in combination with a first implementation of a cover element 23-1 in a perspective view. FIG. 5B represents the cover element 23-1 from FIG. 5A in top view.

The cover element 23-1 developed as a uniform segment of a spherical shell with constant wall thickness, also termed faceplate, is disposed within the not depicted valve block or housing 11 in the direction z underneath the valve element 12-1 and thus between the valve element 12-1 and the housing 11. The contour of an inner surface of the spherical shell corresponds herein to the contour of an outer surface of the spherical valve element 12-1. Housing 11, furthermore, comprises a recess, intended for the integrating reception of the cover element 23-1, which, for the complete adaption of the cover element 23-1, corresponds to the contour of an outer surface of the spherical shell. The recess is consequently developed with the radius of the outer surface of the spherical shell, while the volume, encompassed by the housing 11, for the reception of the valve element 12-1 is developed with the radius of an inner surface of the spherical shell. The contour of an inner surface of housing 11 also corresponds herein to the contour of the outer surface of the spherical valve element 12-1.

After the disposition of the cover element 23-1 within the recess of the housing 11, the volume encompassed by the housing 11 with the integrated cover element 23-1 for the reception of the valve element 12-1 is developed in the form of a sphere and corresponds fully with the valve element 12-1. The valve element 12-1 is herein fully over its entire surface enclosed by housing 11 with the cover element 23-1. The valve element 12-1 is fully in contact over its entire surface on housing 11 with the cover element 23-1.

The axis of rotation of cover element 23-1 and the axis of symmetry of the passage of the first port 13 of housing 11 are disposed coaxially with respect to one another or on a common axis that is oriented in the direction z. The cover element 23-1, supported in housing 11, fixed and thus immovable relative to housing 11 or across a sealing element, in particular in the form of an O-ring, disposed between the cover element 23-1 and the housing 11 is thus disposed such that it closes, at least partially, the passage of the first port 13 developed in housing 11. With a rotation about the axis of rotation 22 the valve element 12-1 is moved relative to the cover element 23-1 as well as to the housing 11.

The cover element 23-1 comprises three circular outlet openings 24, 25, 26 which are developed with equal diameter and are disposed with the centers on a common reference circle diameter referred to the projected center of the spherical shell. The diameters of the outlet openings 24, 25, 26 are herein greater than or equal to the diameter of the through-hole of the opening 18 of valve element 12-1. The reference circle diameter, on which the centers of the outlet openings 24, 25, 26 are located, corresponds to the reference circle diameter on which the through-hole of the first opening 18 of valve element 12-1 is disposed referred to the axis of rotation 22.

A first outlet opening 24 has, in each instance, to an adjacently disposed second outlet opening 25 as well as to the third outlet opening 26 an included angle of 90° referred to the projected center of the spherical shell. The second outlet opening 25 and the third outlet opening 26 are disposed at an angle of 0° or of 180° as well as spaced apart in the direction x.

The axes of symmetry of the outlet openings 24, 25, 26 have each the same inclination referred to the projected center of the spherical shell such that the axes of symmetry of the outlet openings 24, 25, 26, either according to a rotational model or pattern of the cover element 23-1, intersect in a common point on the axis of symmetry of the spherical shell or the axes of symmetry of the outlet openings 24, 25, 26 are disposed parallel to one another and to the axis of symmetry of the spherical shell.

In FIG. 6A to 6E are depicted different connection configuration variants of a device 10 from FIG. 2 with the first implementation of the valve element 12-1 in combination with the first implementation of the cover element 23-1 from FIG. 5A which are settable through a rotation of valve element 12-1 about the axis of rotation 22 within the housing 11 and relative to the housing 11. With the turning of the valve element 12-1 with openings 18, 19, 20, 21 within housing 11 with ports 13, 14, 15 as well as the associated passages in the direction of rotation 27, predetermined through-flow openings and therewith flow paths for the refrigerant through the refrigerant circuit are opened or closed.

Figure 6A:
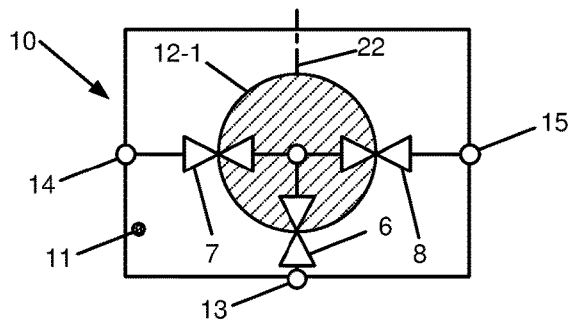
FIG. 6A to 6E: different circuit variants of a device from FIG. 2 with the first implementation of the valve element in combination with the first implementation of the cover element from FIG. 5A, FIG. 7A: a second implementation of the valve element of a device from FIG. 2 in combination with a second implementation of a cover element in a perspective view.
Figure 6A:
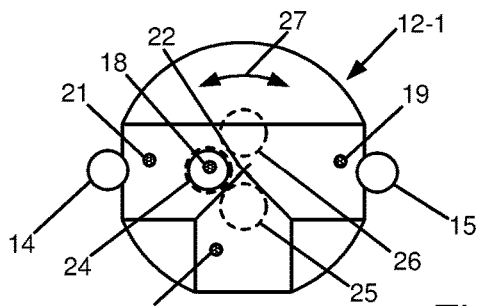

In FIG. 6A a position of the valve element 12-1 in a starting position with the rotational angle of 0° is shown in a connection configuration of the device 10 with the ports 13, 14, 15 of housing 11 open. The axes of symmetry of the passage of the second port 14 and the fourth opening 21 of valve element 12-1 as well as the axes of symmetry of the passage of the third port 15 and of the second opening 19 of the valve element 12-1 are each oriented coaxially with respect to one another. The first port 13 of housing 11 is opened since the valve element 12-1 with respect to the cover element 23-1 is disposed such that the first outlet opening 24 of cover element 23-1 and the first opening 18 of the valve element 12-1 are disposed coaxially with one another or oriented such that they correspond with one another. Consequently, one through-flow opening through the first port 13 and the first opening 18, through the second port 14 and the fourth opening 21 as well as through the third port 15 and the second opening 19 is provided, wherein all ports 13, 14, 15 of housing 11 are fluidically connected with one another.

Figure 6B:
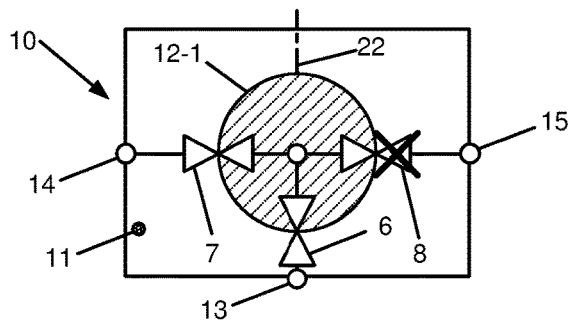
Figure 6B:
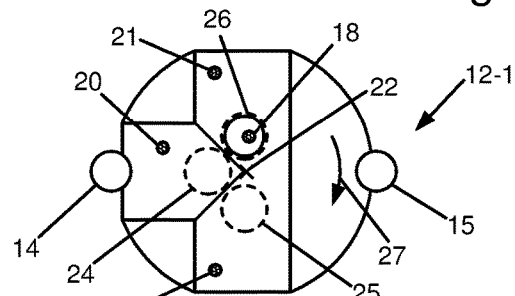

FIG. 6B shows a position of the valve element 12-1 after a turning in the rotational direction 27 by 90° about the rotational axis 22, starting from the position according to FIG. 6A, with a connection configuration of the device 10 with opened first port 13 and second port 14 as well as a closed third port 15, The axes of symmetry of the passage of the second port 14 and the third opening 20 of valve element 12-1 are oriented coaxially. The first port 13 of housing 11 is opened since the valve element 12-1 with respect to the cover element 23-1 is disposed such that the third outlet opening 26 of cover element 23-1 and the first opening 18 of the valve element 12-1 are coaxial with respect to one another or are oriented corresponding to one another. Consequently, one through-flow opening is provided through the first port 13 and the first opening 18 as well as through the second port 14 and the third opening 20, wherein the first port 13 and the second port 14 of housing 11 are fluidically connected with one another.

Figure 6C:
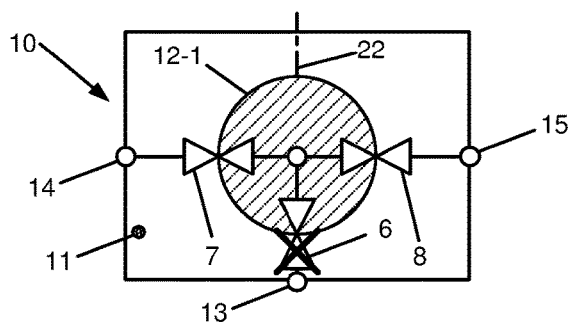
Figure 6C:
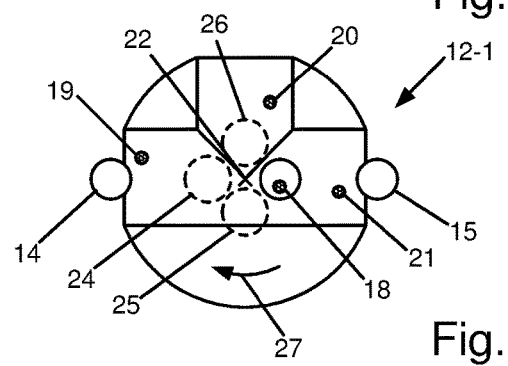

In FIG. 6C a position of the valve element 12-1 is shown after a further turning in the direction of rotation 27 by 90° about the axis of rotation 22, starting from the position according to FIG. 6B, at a circuit-configuration of the device 10 with a closed first port 13 as well as an opened second port 14 and an opened third port 15. The axes of symmetry of the passage of the second port 14 and of the second opening 19 of valve element 12-1 as well as the axes of symmetry of the passage of the third port 15 and of the fourth opening 21 of the valve element 12-1 are each oriented coaxially with respect to one another. The first port 13 of housing 11 is closed since the valve element 12-1 with respect to the cover element 23-1 is disposed such that the first opening 18 of valve element 12-1 is completely covered by the cover element 23-1.

Therewith, one through-flow opening through the second port 14 and the second opening 19 as well as through the third port 15 and the fourth opening 21 is provided, wherein the second port 14 and the third port 15 of housing 11 are fluidically connected with one another.

Figure 6D:
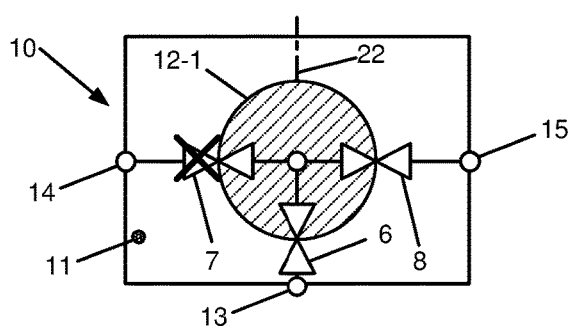
Figure 6D:
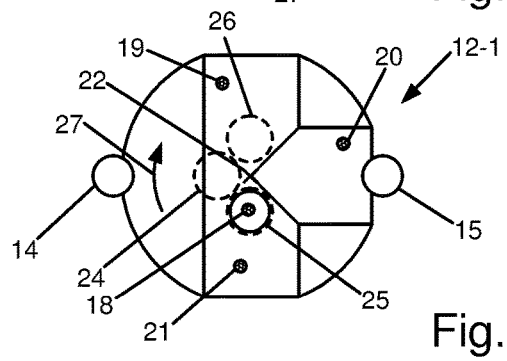

FIG. 6D shows a position of valve element 12-1 after a further turning, starting from the position according to FIG. 6C, in the direction of rotation 27 by 90° about the axis of rotation 22, at a connection configuration of the device 10 with opened first port 13 and third port 15 as well as a closed second port 14. The axes of symmetry of the passage of the third port 15 and of the third opening 20 of the valve element 12-1 are oriented coaxially with respect to one another. The first port 13 of housing 11 is opened since the valve element 12-1 with respect to the cover element 23-1 is disposed such that the second outlet opening 25 of cover element 23-1 and the first opening 18 of the valve element 12-1 are disposed coaxially with respect to one another or oriented corresponding to one another. Consequently, one through-flow opening through the first port 13 and the first opening 18 as well as through the third port 15 and the third opening 20 is provided, wherein the first port 13 and the third port 15 of housing 11 are fluidically connected with one another.

Figure 6E:
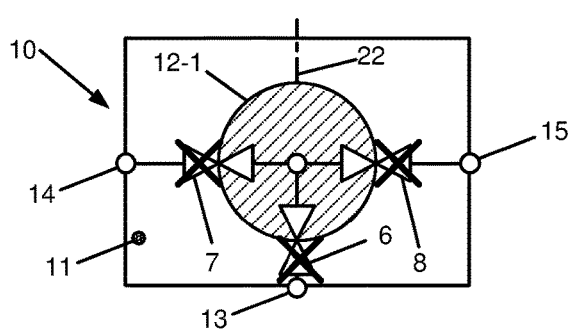
Figure 6E:
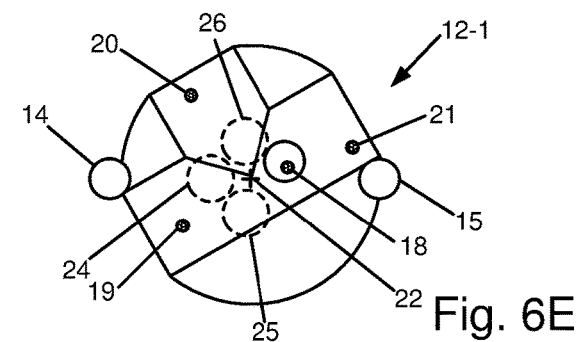

FIG. 6E shows an intermediate position of valve element 12-1 between the positions according to FIGS. 6B and 6C after a turning, starting from the position according to FIG. 6B, in the direction of rotation 27 about an angle less than 90°, in particular in a range of 40° to 60°, at a connection configuration of the device 10 with closed ports 13, 14, 15 of housing 11. The axes of symmetry of the passages of ports 14, 15 of housing 11 and of the openings 19, 20, 21 of the valve element 12-1 are not coaxial with one another. The first port 13 of housing 11, moreover, is closed since the valve element 12-1 with respect to the cover element 23-1 is disposed such that the first opening 18 of valve element 12-1 is completely covered by cover element 23-1.

None of the outlet openings 24, 25, 26 of cover element 23-1 is oriented coaxially with the first opening 18 of valve element 12-1 or oriented such that it corresponds with the first opening 18 of valve element 12-1. Since no through-hole of an opening 19, 20, 21 of valve element 12-1 is associated with any of the passages of ports 14, 15 of housing 11 and the flow cross sections of the passages of ports 14, 15 as well as the through-holes of openings 19, 20, 21 do not overlap, there is no formation of a through-flow opening. The flow cross sections of the first port 13 of housing 11 as well as of the outlet openings 24, 25, 26 do not overlap and thus do not form a through-flow opening.

In FIGS. 7A and 7B is shown a second implementation of the valve element 12-2 of a device 10 from FIG. 2 and FIG. 4, respectively according to FIG. 7A in combination with a second implementation of the cover element 23-2 in a perspective view as well as according to FIG. 7B in a sectional representation through a great circle plane. In FIG. 8A the cover element 23-2 from FIG. 7A is shown in a top view from above, while the valve element 12-2 from FIG. 8B is depicted in a top view from below.

The valve element 12-2 comprises five circular cylindrical openings 18a, 18b, 19. 20, 21, developed as through-holes, whose flow cross sections have a constant diameter over the length of the openings 18a, 18b, 19, 20, 21. The significant difference between the first implementation of valve element 12-1 from FIGS. 3A and 2B as well as the second implementation of valve element 12-2 lies in the development of an additional through-hole of the first opening 18 such that the valve element 12-2 has a first through-hole 18a and a second through-hole 18b of the first opening 18.

The diameter of the through-holes 18a, 18b of the first opening 18 are identical and in each instance less than the diameter of the three further openings 19, 20, 21, wherein the diameters of the latter preferably have identical values.

The axes of symmetry of the through-holes 18a, 18b of the first opening 18 are oriented on a common reference circle diameter, referred to the axis of rotation 22 extending in the direction z of valve element 12-2, offset from one another by an angle of 90° and parallel to one another as well as to the axis of rotation 22 as well as eccentrically to the valve element 12-2. The axes of symmetry of the through-holes 18a, 18b of the first opening 18 and the axis of rotation 22 of valve element 12-2 are in each instance spaced apart at such distance that the axis of symmetry of the first through-hole 18a of the first opening 18 intersects the axis of symmetry of the lead-through, developed between the second opening 19 and the fourth opening 21, in a great circle sectional plane, and that the axis of symmetry of the second through-hole 18b of the first opening 18 intersects the axis of symmetry of the through-hole of the third opening 20 in a great circle sectional plane. While the first through-hole 18a, oriented orthogonally to the lead-through developed between the second opening 19 and the fourth opening 21, of the first opening 18, referred to the center of the valve element 12-2, is offset in the direction of the fourth opening 21, the axis of symmetry of the second through-hole 18b of the first opening 18 is offset in the direction of the third opening 20 referred to the center of valve element 12-2.

The through-holes 18a, 18b of the first opening 18 of valve element 12-2 are provided on the side of the valve element 12-2 that is opposite to the not depicted connecting element 17 of the drive element 16. The spherical valve element 12-2 is oriented within the not depicted housing 11 such that the through-holes 18a, 18b of the first opening 18 of valve element 12-2 and the passage of the first port 13 of housing 11 can in each instance form a common through-flow opening. The axes of symmetry of the through-holes 18a, 18b of the first opening 18 of the valve element 12-2 and the passage of the first port 13 of housing 11 are in each instance disposed in parallel and offset with respect to one another.

The second implementation of cover element 23-2, developed as a uniform segment of a spherical shell with constant wall thickness, is disposed within the not depicted valve block or housing 11 in the direction z underneath the valve element 12-2 and therewith between the valve element 12-2 and the housing 11. The significant difference between the first implementation of cover element 23-1 from FIGS. 5A and 5B as well as the second implementation of the cover element 23-2 lie in the implementation of the outlet openings 24, 25. The second implementation of cover element 23-2 is developed without the third outlet opening 26. The first outlet opening 24 as well as also the second outlet opening 25 are herein disposed identically to the first implementation of cover element 23-1. The first outlet opening 24 forms thus an included angle of 90° with the second outlet opening 25 referred to the projected center of the spherical shell.

In a position of the valve element 12-2 in a starting position with a rotational angle of 0° of valve element 12-2 within the housing 11, the through-holes 18a, 18b of the first opening 18 of the valve element 12-2 completely overlap the through-holes 24, 25 of the cover element 23-2. The first through-hole 18a of the first opening 18 herein coincides with the first outlet opening 24 and the second through-hole 18b of the first opening 18 with the second outlet opening 25.

FIG. 9A to 9E depict different connection configuration variants of a device 10 from FIG. 2 with the second implementation of valve element 12-2 in combination with the second implementation of the cover element 23-2 from FIG. 7A, which variants are settable through a rotation of the valve element 12-2 about the axis of rotation 22 within the housing 11 and relative to the housing 11. With the turning of valve element 12-2 with the openings 18, 19, 20, 21, specifically also with the through-holes 18a, 18b of the first opening 18, within the housing 11 with the ports 13, 14, 15 as well as the associated passages in the direction of rotation 27, similar to the valve element 12-1 in combination with the cover element 23-1, predetermined through-flow openings, and therewith flow paths, for the refrigerant through the refrigerant circuit are opened or closed.

Figure 9A:
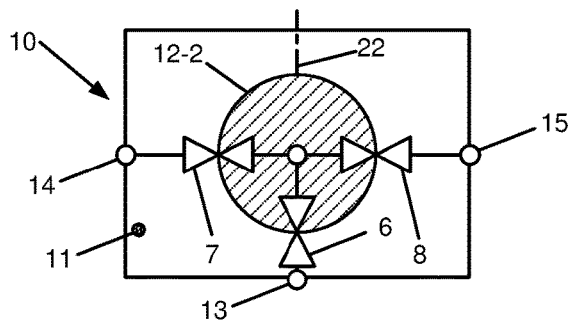
FIG. 9A to 9E: different variants of connection configurations of a device from FIG. 2 with the second implementation of the valve element in combination with the second implementation of the cover element from FIG. 7A.
Figure 9A:
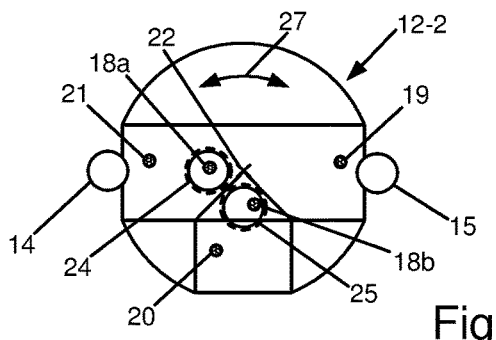

In FIG. 9A a position of the valve element 12-2 is shown in a starting position at a rotational angle of 0° in a connection configuration of the device 10 with, in each instance, open ports 13, 14, 15 of housing 11. The axes of symmetry of the passages of the second port 14 and the fourth opening 21 of valve element 12-2 as well as the axes of symmetry of the passage of the third port 15 and the second opening 19 of the valve element 12-2 are in each instance oriented coaxially with respect to one another. The first port 13 of housing 11 is also opened since the valve element 12-2 with respect to the cover element 23-2 is disposed such that the first outlet opening 24 of the cover element 23-2 and the first through-hole 18a of the first opening 18 of valve element 12-2 as well as the second outlet opening 25 of the cover element 23-2 and the second through-hole 18b of the first opening 18 of valve element 12-2 are oriented coaxially to one another or correspond to one another. Thus, in each instance a through-flow opening is provided through the first port 13 and the through-holes 18a, 18b of the first opening 18, through the second port 14 and the fourth opening 21 as well as through the third port 15 and the second opening 19, wherein all ports 13, 14, 15 of housing 11 are fluidically connected with one another.

Figure 9B:
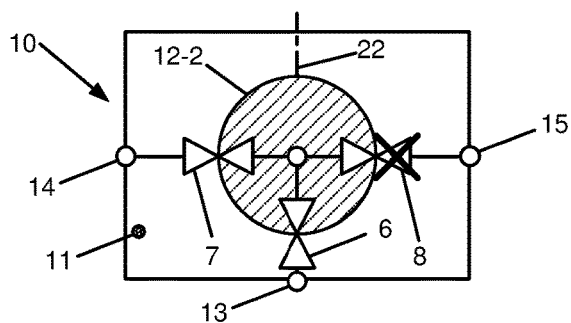
Figure 9B:
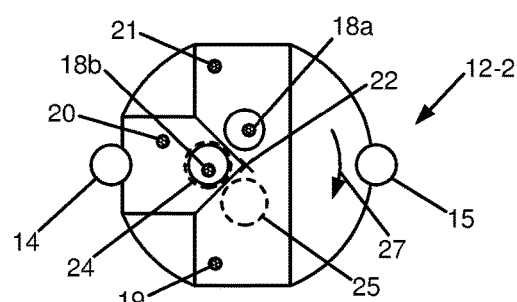

FIG. 9B shows a position of the valve element 12-2 after a rotation, starting from the position according to FIG. 9A, in the direction of rotation 27 by 90° about the axis of rotation 22 in a connection configuration of the device 10 with an opened first port 13 and a second port 14 as well as with a closed third port 15. The axes of symmetry of the passage of the second port 14 and of the third opening 20 of valve element 12-2 are oriented coaxially with one another.

The first port 13 of housing 11 is open since the valve element 12-2 is disposed with respect to the cover element 23-2 such that the first outlet opening 24 of cover element 23-2 and the second through-hole 18b of the first opening 18 of valve element 12-2 are oriented coaxially with respect to one another or correspond to one another. Therewith, in each instance, a through-flow opening is provided through the first port 13 and the second through-hole 18b of the first opening 18 as well as through the second port 14 and the third opening 20, wherein the first port 13 and the second port 14 of housing 11 are fluidically connected with one another.

Figure 9C:
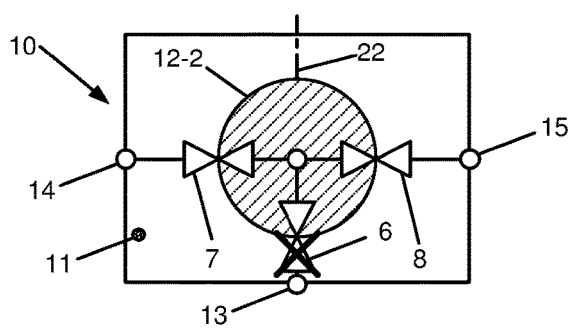
Figure 9C:
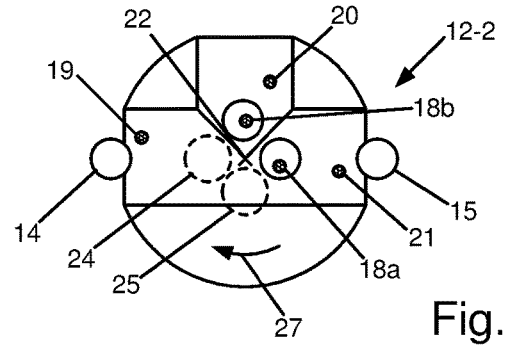

FIG. 9C shows a position of the valve element 12-2 after a further rotation, starting from the position according to FIG. 9B, in the direction of rotation 27 by 90° about the axis of rotation 22 in a connection configuration of the device 10 of the device 10 with a closed first port 13 as well as an opened second port 14 and an opened third port 15. The axes of symmetry of the passage of the second port 14 and the second opening 19 of valve element 12-2 as well as the axes of symmetry of the passage of the third port 15 and of the fourth opening 21 of the valve element 12-2 are oriented coaxially with respect to one another. The first port 13 of housing 11 is closed since the valve element 12-2 is disposed with respect to the cover element 23-2 such that the through-holes 18a, 18b of the first opening 18 of valve element 12-2 are each completely covered by the cover element 23-2. Therewith, in each instance, a through-flow opening is provided through the second port 14 and the second opening 19 as well as through the third port 15 and the fourth opening 21, wherein the second port 14 and the third port 15 of housing 11 are fluidically connected with one another.

Figure 9D:
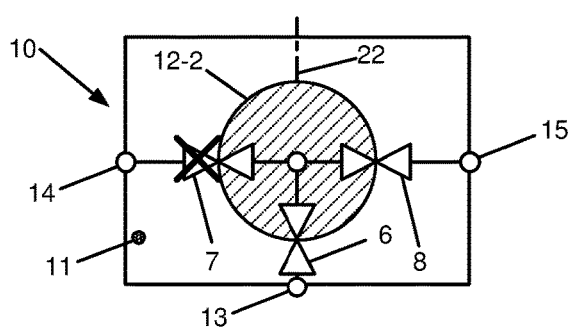
Figure 9D:
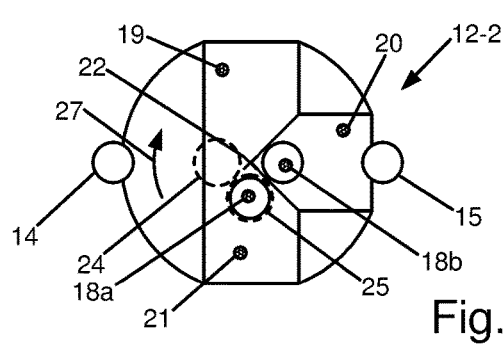

FIG. 9D shows a position of valve element 12-2 after a further rotation, starting from the position according to FIG. 9C, in the direction of rotation 27 by 90° about the axis of rotation 22 in a connection configuration of the device 10 with an opened first port 13 and third port 15 as well as a closed second port 14. The axes of symmetry of the passage of the third port 15 and of the third opening 20 of the valve element 12-2 are oriented coaxially with respect to one another. The first port 13 of housing 11 is opened since the valve element 12-2 with respect to the cover element 23-2 is disposed such that the second outlet opening 25 of cover element 23-2 and the first through-hole 18a of the first opening 18 of the valve element 12-2 are oriented coaxially with respect to one another or correspond to one another. Therewith, in each instance, a through-flow opening is provided through the first port 13 and the first through-hole 18a of the first opening 18 as well as through the third port 15 and the third opening 20, wherein the first port 13 and the third port 15 of housing 11 are fluidically connected with one another.

Figure 9E:
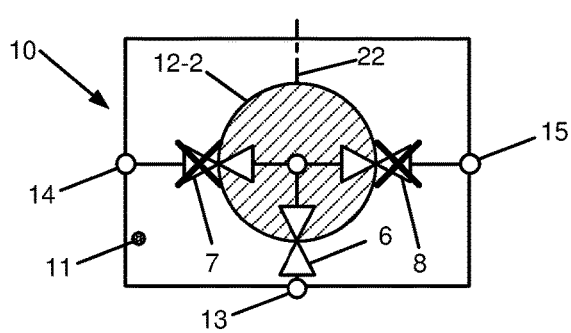
Figure 9E:
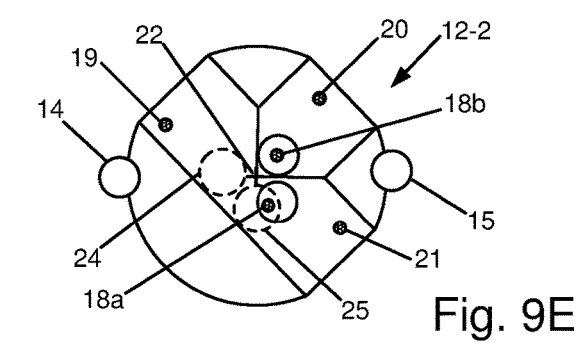

FIG. 9E shows an intermediate position of the valve element 12-2 between the positions according to FIGS. 6C and 6D after a rotation in the direction of rotation 27 about an angle less than 90°, in particular in a range of 35° to 55°, specifically by 45°, about the axis of rotation 22, starting from the position according to FIG. 6C, in a connection configuration of the device 10 with an at least partially opened first port 13 as well as a closed second port 14 and a closed third port 15. The axes of symmetry of the passages of ports 14, 15 of housing 11 and of the openings 19, 20, 21 of valve element 12-2 are each oriented coaxially with respect to one another. In addition, the particular flow cross sections of the passages of ports 14, 15 as well as of the through-holes of openings 19, 20, 21 do not overlap. Only the first port 13 of housing 11 is opened since the valve element 12-2 is disposed with respect to the cover element 23-2 such that the flow cross sections of the through-hole [18a] of the first opening 18a [sic: 18] of valve element 12-2 and the second outlet opening 25 of the cover element 23-2 are disposed such that they at least partially overlap.

However, since at least two of the three passages of ports 13, 14, 15 of housing 11 are not associated with a through-hole of an opening 18, 19, 20, 21 of valve element 12-2, and the flow cross sections of the passages of ports 14, 15 as well as of the through-holes of openings 19, 20, 21 do not overlap, no through-flow opening is formed.

According to an alternative, not depicted implementation, the valve element is developed in the form of a cylinder. The second and third port of the housing disposed in a plane spanned by the directions x, y correspond to the second, third and fourth opening of the valve element disposed on the lateral surface of the cylinder, while the at least one opening of the valve element corresponding with the first port, oriented in the direction z, of the housing, is provided on an end side of the cylinder. The drive element of the device is disposed on the side on the housing opposite to the first port in connection with the at least one first opening of the valve element as well as on the opposite end side of the cylindrical valve element. The cylindrical valve element can have the same diameter as the spherical valve element.

To correspond with the planar front surface of the cylinder, the cover element associated with the valve element is developed as a disk with a planar surface and is disposed in contact on the end side of the cylinder and thus is integrated in the housing.

LIST OF REFERENCE SYMBOLS

1 Connection configuration, fluid circuit
2 Connection site
3 First port
4 Second port
5 Third port
6 First valve
7 Second valve
8 Third valve
10 Device
11 Housing
12, 12-1, 12-2 Valve element
13 First port housing 11
14 Second port housing 11
15 Third port housing 11
16 Drive element, drive element, valve element 12
17 Connecting element, drive element 16
18 First opening, valve element 12-1
18a First through-hole, first opening, valve element 12-2
18b Second through-hole, first opening, valve element 12-2
19 Second opening, valve element 12-1
20 Third opening, valve element 12-1
21 Fourth opening, valve element 12-1
22 Axis of rotation, valve element 12
23-1, 23-2 Cover element
24 First outlet opening, cover element 23-1, 23-2
25 Second outlet opening, cover element 23-1, 23-2
26 Third outlet opening, cover element 23-1
27 Direction of rotation, valve element
x, y, z Direction

What is claimed:

1. A device for regulating and controlling a flow-through, and distributing a fluid in a fluid circuit, comprising a housing with ports for connecting with fluid lines that are in each instance connected across a passage within an interior volume of the housing as well as a valve element disposed in the interior volume of the housing with a drive element for moving the valve element relative to the housing wherein the valve element is supported rotatably about an axis of rotation and comprises openings that extend into an interior of the valve element as through-holes and form in the interior of the valve element a common volume,
   wherein an axis of symmetry of at least one through-hole of a first opening and the axis of rotation of the valve element as well as an axis of symmetry of a passage within the interior of a first port of the housing are disposed in a direction z,
   wherein axes of symmetry of through-holes of at least three openings of the valve element and of passages within each of two respective ports of the housing are disposed in a plane spanned by two directions x, y,
   wherein the directions x, y, z are each oriented perpendicularly to one another; and
   wherein a cover element with at least two outlet openings is positioned in the housing, wherein the cover element covers a flow cross section of the passage of the first port of the housing in a first position and opens the flow cross section of the passage of the first port in a second position.

2. A device as in claim 1, wherein the axes of symmetry of the passages of the ports of the housing and the axis of rotation of the valve element have a common point of intersection in which the valve element is disposed with its center point.

3. A device as in claim 2, wherein the outlet openings in each instance have a circular flow cross section and are disposed with their center points on a common reference circle diameter referred to a projected center point of a spherical shell.

4. A device as in claim 3, wherein the diameters of the outlet openings are in each instance greater than or equal to the diameter of a through-hole of the first opening of the valve element.

5. A device as in claim 3, wherein a first outlet opening and a second outlet opening, disposed adjacently to the first outlet opening, are developed at an angle of 90° referred to the projected center point of the spherical shell.

6. A device as in claim 1, wherein the first port of the housing is disposed on a side of the valve element opposite to the drive element and wherein a second port and a third port are positioned on sides of the housing opposite to one another.

7. A device as in claim 1, wherein the axes of symmetry of the passages provided in the interior of a second port and of a third port of the housing are disposed on a common axis oriented in the y-direction.

8. A device as in claim 1, wherein the axes of symmetry of the passages of the first port, of a second port, as well as of a third port of the housing are positioned in a plane spanned by the directions y, z in the form of a T with respect to one another.

9. A device as in claim 1, wherein the axis of symmetry of the passages of the first port of the housing and the axis of rotation of the valve element are disposed such that they are oriented coaxially with one another.

10. A device as in claim 1, wherein the valve element is spherical.

11. A device as in claim 1, wherein the axes of symmetry of the at least three openings, disposed in the plane spanned by two directions x, y, of valve element have a common point of intersection in the center of the valve element.

12. A device as in claim 1, wherein the axis of rotation of the valve element is disposed such that it extends through the center of the valve element.

13. A device as in claim 1, wherein the axis of symmetry of the at least one through-hole of the first opening is disposed such that it is oriented spaced apart from the axis of rotation of the valve element.

14. A device as in claim 1, wherein the axes of symmetry of three of the openings, disposed in the plane spanned by two directions x, y, of the valve element are in the form of a T with respect to one another, wherein the axes of symmetry of a second opening and of a third opening as well as of the third opening and a fourth opening are each oriented orthogonally to one another, wherein the axes of symmetry of the second opening and of the fourth opening are disposed such that they are oriented coaxially with one another.

15. A device as in claim 14, wherein the axes of symmetry of a through-hole of the first opening and of the second opening of the valve element are oriented such that they intersect, wherein the axis of symmetry of the first through-hole of the first opening is disposed offset from the center of the valve element in the direction of the fourth opening.

16. A device as in claim 1, wherein the first opening of the valve element is developed with a first through-hole and a second through-hole of at least two through-holes.

17. A device as in claim 16, wherein the axes of symmetry of the through-holes of the first opening are disposed on a common reference circle diameter referred to the axis of rotation of the valve element.

18. A device as in claim 17, wherein the axes of symmetry of the through-holes of the first opening are disposed such that they are offset at an angle of 90° about the axis of rotation of the valve element as well as being disposed parallel to one another.

19. A device as in claim 16, wherein the axes of symmetry of the second through-hole of the first opening and of the third opening of the valve element are oriented such that they intersect, wherein the axis of symmetry of the second through-hole of the first opening is disposed offset from the center of the valve element in the direction of the third opening.

20. A device as in claim 1, wherein the at least one through-hole of the first opening of the valve element is developed on a side that is opposite to the side oriented to the drive element.

21. A device as in claim 1, wherein the at least one through-hole of the first opening of the valve element has a diameter, wherein the diameter of the through-hole of the first opening is equal to or less than the diameter of the openings disposed in the plane spanned by the directions x, y, of the valve element.

22. A device as in claim 1, wherein the outlet openings in each instance have a circular flow cross section and are disposed with their center points on a common reference circle diameter referred to a projected center point of a spherical shell.

23. A device as in claim 1, wherein the cover element is a uniform segment of a spherical shell with constant wall thickness, also termed face, is disposed between the valve element and the housing, and a contour of an inner surface of the spherical shell corresponds to a contour of an outer surface of the spherical valve element.

24. A device comprising:
- a valve element having an interior having an interior volume;
- a housing, the housing comprising ports for connecting with fluid lines that are in each instance connected across a passage within an interior volume of the housing as well as the valve element,
- wherein the valve element is disposed in the interior volume of the housing,
- wherein the valve element comprises a drive element for moving the valve element relative to the housing, and wherein the valve element comprises openings that extend into the interior of the valve element;
- wherein the valve element is supported rotatably about an axis of rotation and comprises through-holes extending into the interior of the valve element from the openings, wherein the through-holes form the interior volume in the interior of the valve element,
- wherein an axis of symmetry of at least one through-hole of a first opening and the axis of rotation of the valve element as well as an axis of symmetry of a passage within the interior of a first port of the housing are disposed in a direction z,
- wherein axes of symmetry of through-holes of at least three openings of the valve element and of passages within each of two respective ports of the housing are disposed in a plane spanned by two directions x, y,
- wherein the directions x, y, z are each oriented perpendicularly to one another; and
- wherein a cover element with at least two outlet openings is fixedly positioned in the housing.

25. A device as in claim 24, wherein the cover element is a uniform segment of a spherical shell with constant wall thickness, also termed face, is disposed between the valve element and the housing, and a contour of an inner surface of the spherical shell corresponds to a contour of an outer surface of the spherical valve element.

* * * * *